United States Patent
Meir et al.

(10) Patent No.: US 9,098,445 B2
(45) Date of Patent: Aug. 4, 2015

(54) SELECTION OF REDUNDANT STORAGE CONFIGURATION BASED ON AVAILABLE MEMORY SPACE

(71) Applicant: Apple Inc., Cupertino, CA (US)

(72) Inventors: Avraham Poza Meir, Rishon Le-Zion (IL); Oren Golov, Hod-Hasharon (IL); Sasha Paley, Kfar-Saba (IL); Ori Moshe Stern, Modi'in (IL); Etai Zaltsman, Ramat-Hasaron (IL)

(73) Assignee: Apple Inc., Cupertino, CA (US)

( * ) Notice: Subject to any disclaimer, the term of this patent is extended or adjusted under 35 U.S.C. 154(b) by 198 days.

(21) Appl. No.: 13/826,203

(22) Filed: Mar. 14, 2013

(65) Prior Publication Data

US 2014/0281801 A1  Sep. 18, 2014

(51) Int. Cl.
*G11C 29/00* (2006.01)
*G06F 11/14* (2006.01)
*G06F 11/10* (2006.01)
*G06F 3/06* (2006.01)

(52) U.S. Cl.
CPC ............ *G06F 11/1412* (2013.01); *G06F 3/064* (2013.01); *G06F 3/0619* (2013.01); *G06F 3/0688* (2013.01); *G06F 11/10* (2013.01); *G06F 11/108* (2013.01); *G06F 11/1048* (2013.01)

(58) Field of Classification Search
CPC ... G06F 11/10; G06F 3/0619; G06F 11/1076; G06F 3/064; G06F 3/0688; G06F 11/1048

USPC ............ 714/763, 769; 711/154, 114
See application file for complete search history.

(56) References Cited

U.S. PATENT DOCUMENTS

| | | | |
|---|---|---|---|
| 7,130,973 | B1 | 10/2006 | Chong |
| 8,327,226 | B2 | 12/2012 | Rub |
| 2002/0087822 | A1 | 7/2002 | Butterworth |
| 2007/0204028 | A1* | 8/2007 | Lee ............................ 709/223 |
| 2009/0113235 | A1 | 4/2009 | Selinger |
| 2009/0319864 | A1 | 12/2009 | Shrader |
| 2010/0251068 | A1* | 9/2010 | Lin et al. .................... 714/755 |
| 2011/0060967 | A1 | 3/2011 | Warren |
| 2012/0084506 | A1 | 4/2012 | Colgrove et al. |
| 2012/0311393 | A1 | 12/2012 | Bueb et al. |
| 2013/0173997 | A1 | 7/2013 | Suzumura |
| 2014/0006851 | A1 | 1/2014 | Kimura |

OTHER PUBLICATIONS

International Search Report and Written Opinion from PCT/US2014/020586, mailed Jul. 3, 2014, Apple Inc., pp. 1-9.

* cited by examiner

*Primary Examiner* — Guy Lamarre
(74) *Attorney, Agent, or Firm* — Meyertons, Hood, Kivlin, Kowert & Goetzel, P.C.

(57) ABSTRACT

A method includes, in a memory controller that controls a memory, evaluating an available memory space remaining in the memory to write data. A redundant storage configuration is selected in the memory controller depending on the available memory space. Redundancy information is calculated over the data using the selected redundant storage configuration. The data and the redundancy information are written to the available memory space in the memory.

14 Claims, 1 Drawing Sheet

SELECTION OF REDUNDANT STORAGE CONFIGURATION BASED ON AVAILABLE MEMORY SPACE

FIELD OF THE INVENTION

The present invention relates generally to memory systems, and particularly to redundant storage configurations.

BACKGROUND OF THE INVENTION

Non-volatile memory systems, such as Solid State Drives (SSD), sometimes store data using redundant storage schemes in order to ensure that data written to the SSD can be successfully retrieved in the event of memory failure. Various redundant storage schemes for non-volatile memory are known in the art.

For example, U.S. Patent Application Publication 2010/0017650, whose disclosure is incorporated herein by reference, describes a non-volatile memory data storage system, which includes a host interface for communicating with an external host, and a main storage including a first plurality of Flash memory devices. Each memory device includes a second plurality of memory blocks. A third plurality of first stage controllers are coupled to the first plurality of Flash memory devices. A second stage controller is coupled to the host interface and the third plurality of first stage controller through an internal interface. The second stage controller is configured to perform Redundant Array of Independent Disks (RAID) operation for data recovery according to at least one parity.

As another example, U.S. Patent Application Publication 2009/0204872, whose disclosure is incorporated herein by reference, describes a Flash module having raw-NAND Flash memory chips accessed over a Physical-Block Address (PBA) bus by a controller. The controller converts logical block addresses to physical block addresses. In some embodiments, data can be arranged to provide redundant storage, which is similar to a RAID system, in order to improve system reliability.

SUMMARY OF THE INVENTION

An embodiment of the present invention described herein provides a method including, in a memory controller that controls a memory, evaluating an available memory space remaining in the memory to write data. A redundant storage configuration is selected in the memory controller depending on the available memory space. Redundancy information is calculated over the data using the selected redundant storage configuration. The data and the redundancy information are written to the available memory space in the memory.

In some embodiments, selecting the redundant storage configuration includes choosing, based on the available memory space, a number of memory blocks over which the redundancy information is calculated. In other embodiments, selecting the redundant storage configuration includes choosing an Error Correction Code (ECC) having a code rate that depends on the available memory space, and calculating the redundancy information includes computing the redundancy information using the chosen ECC. In yet other embodiments, selecting the redundant storage configuration includes reassigning one or more memory blocks from storing a part of the redundancy information to storing a portion of the data.

In some embodiments, selecting the redundant storage configuration includes switching from a first storage configuration that protects against failure of one or more entire memory blocks to a second storage configuration that protects against failure of only portions of the memory blocks. In other embodiments, switching from the first to the second storage configuration is performed while recycling a redundancy block produced by the first storage configuration. In yet other embodiments, selecting the redundant storage configuration includes modifying the redundant storage configuration upon detecting that the available memory space is below a predefined threshold.

There is additionally provided, in accordance with an embodiment of the present invention, an apparatus including a memory and a memory controller. The memory controller is configured to evaluate an available memory space remaining in the memory to write data, to select a redundant storage configuration depending on the available memory space, to calculate redundancy information over the data using the selected redundant storage configuration, and to write the data and the redundancy information to the available memory space in the memory.

There is additionally provided, in accordance with an embodiment of the present invention, a memory controller including an interface and a processor. The interface is configured to communicate with a memory. The processor is configured to evaluate an available memory space remaining in the memory to write data, to select a redundant storage configuration depending on the available memory space, to calculate redundancy information over the data using the selected redundant storage configuration, and to write the data and the redundancy information to the available memory space in the memory.

The present invention will be more fully understood from the following detailed description of the embodiments thereof, taken together with the drawings in which:

DETAILED DESCRIPTION OF EMBODIMENTS

Overview

Embodiments of the present invention described herein provide improved redundant storage schemes for protecting memory systems, such as a Solid State Drive (SSD), against memory failures. The disclosed techniques enable a memory controller the freedom to select a redundant storage configuration based on the available memory space in order to improve the overall performance of the memory system.

For example, the memory controller may reassign memory space from storing redundancy information to storing data, when the controller evaluates that there may not be enough memory space to write new data. As another example, when the available memory space is small, the memory controller may choose redundant storage schemes that generate less redundancy information and thus less overhead.

In a typical implementation, the memory controller first evaluates the currently available memory space. The memory controller then has the flexibility to choose the method for calculating new redundancy information, and the memory space in which the new redundancy information and new data will both occupy, based on the currently available memory space.

Using the disclosed techniques described herein, storage reliability can be traded for memory space as needed: Data is stored with very high reliability when the available memory space permits. When the memory becomes full, additional memory space can be obtained at the expense of some degradation in resilience to failures.

System Description

Figure 1:
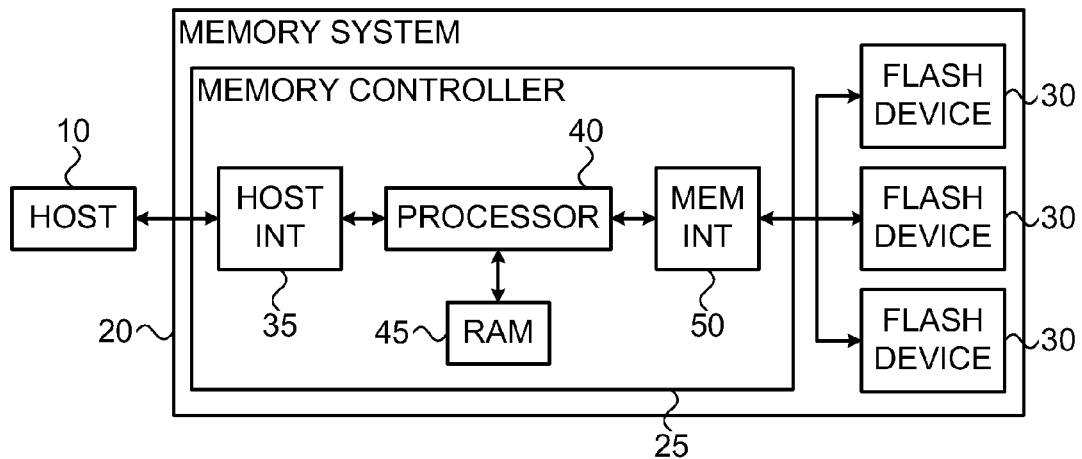
FIG. 1 is a block diagram that schematically illustrates a memory system, in accordance with an embodiment of the present invention.

FIG. 1 is a block diagram that schematically illustrates a memory system 20, in accordance with an embodiment of the present invention. A host 10 sends data for storage and conversely receives data retrieved from storage from memory system 20. System 20 can be used in various host systems and devices, such as in computing devices, cellular phones or other communication terminals, removable memory modules (sometimes referred to as "USB Flash Drives"), Solid State Drives (SSD), digital cameras, music and other media players and/or any other system or device in which data is stored and retrieved.

Memory system 20 comprises a memory controller 25 that reads and writes data to a non-volatile memory, in the present example one or more Flash memory devices 30. Controller 25 comprises a host interface 35 for communicating with host 10, a processor 40 that carries out the methods described herein, a Random Access Memory (RAM) 45, and a memory interface 50 for communicating with Flash devices 30.

In alternative embodiments, the non-volatile memory in memory system 20 may comprise any other suitable type of non-volatile memory, such as, for example, NOR Flash, Charge Trap Flash (CTF), Phase Change RAM (PRAM), Magneto-resistive RAM (MRAM) or Ferroelectric RAM (FeRAM).

Each Flash device comprises multiple analog memory cells. Each analog memory cell stores an analog voltage, also referred to as a storage value, such as an electrical charge or voltage, which represents the information stored in the cell. In Flash memories, the range of possible analog values is divided into regions, each region corresponding to one or more data bit values. Data is written to analog memory cells by writing a nominal analog value that corresponds to the desired bit or bits.

Typically, the memory cells in each device 30 are arranged in memory blocks. Each memory block comprises an array of memory cells whose rows are associated with word lines and whose columns are associated with bit lines. Each word line typically stores one or more pages of data. Data is typically written and read in page units, and erased in block units. The performance of system 20 may be affected by various memory failures, e.g., block failures or word-line failures. In some embodiments that are described herein, memory controller 25 applies redundant storage configurations that protect the stored data from such failures.

Controller 25, and in particular processor 40, may be implemented in hardware. Alternatively, the controller may comprise a microprocessor that runs suitable software, or a combination of hardware and software elements.

The configuration of FIG. 1 is an exemplary system configuration, which is shown purely for the sake of conceptual clarity. Any other suitable memory system configuration can also be used. Elements that are not necessary for understanding the principles of the present invention, such as various interfaces, addressing circuits, timing and sequencing circuits and debugging circuits, have been omitted from the figure for clarity.

Although the example of FIG. 1 shows three memory devices 30, system 20 may comprise any desired number of memory devices that are controlled by memory controller 25. In the exemplary system configuration shown in FIG. 1, memory devices 30 and memory controller 25 are implemented as two separate Integrated Circuits (ICs). In alternative embodiments, however, the memory devices and the memory controller may be integrated on separate semiconductor dies in a single Multi-Chip Package (MCP) or System on Chip (SoC), and may be interconnected by an internal bus. Further alternatively, some or all of the memory controller circuitry may reside on the same die on which the memory devices are disposed. Further alternatively, some or all of the functionality of memory controller 25 can be implemented in software and carried out by a processor or other element of the host system. In some embodiments, host 10 and memory controller 25 may be fabricated on the same die, or on separate dies in the same device package.

In some embodiments, memory controller 25 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Selection of Redundant Storage Configurations Based on Available Memory Space

As noted above, various types of memory failures may occur in devices 30. Possible memory failures comprise, for example, failure of a memory block or a word line in one of devices 30. In order to protect the data from such failures, memory controller 25 stores the data using a redundant storage configuration.

In some practical cases, most block failures occur during programming, and therefore a higher degree of protection is typically needed at that stage. Example techniques for protecting data from programming failures are described in U.S. patent application Ser. No. 13/592,561, filed Aug. 23, 2012, which is assigned to the assignee of the present patent application and whose disclosure is incorporated herein by reference.

Typically, the memory controller calculates redundancy information over certain data, and stores the data and the redundancy information in devices 30. The redundant storage configuration is designed so that, in case of a memory failure, the data in the failed memory cells can be reconstructed using the remaining data and the redundancy information. For example, the memory controller may use a RAID scheme for this purpose.

In practice, however, the failure resilience of the redundant storage comes at the expense of memory space. More redundancy typically improves the resilience to failures, but on the other hand reduces the available memory space. In some embodiments, memory controller 25 adapts the relative size of the redundancy information, i.e., the amount of memory overhead incurred by the redundant storage, to match the available memory space in devices 30.

Figure 2:
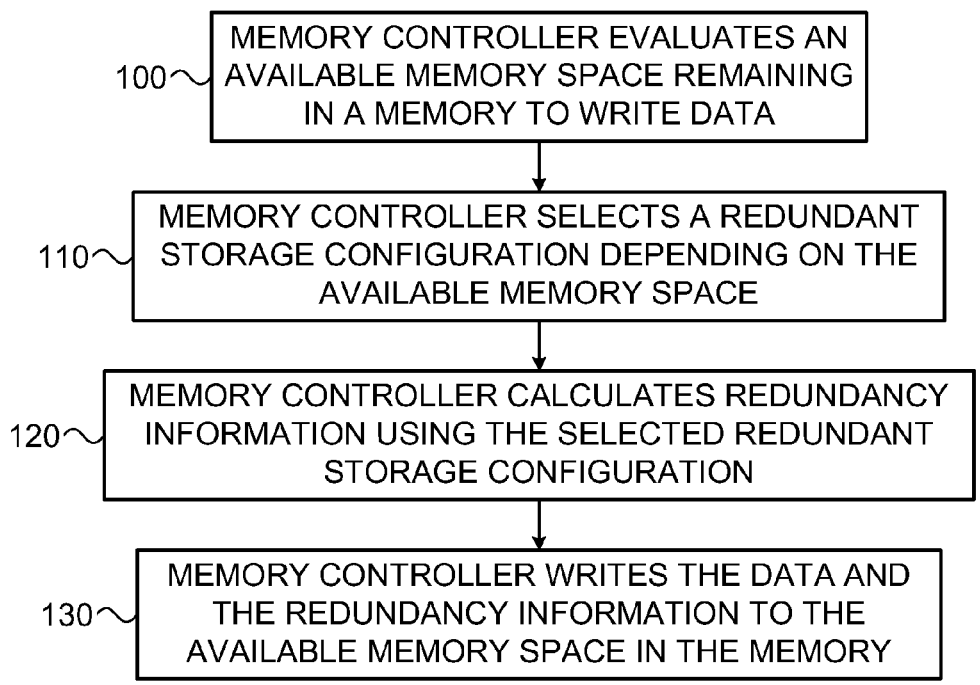
FIG. 2 is a flow chart that schematically illustrates a method for selecting a redundant storage configuration, in accordance with an embodiment of the present invention.

FIG. 2 is a flow chart that schematically illustrates a method for selecting a redundant storage configuration, in accordance with an embodiment of the present invention. In an evaluating step 100, memory controller 25 evaluates the available memory space in memory devices 30 to write data.

In a selecting step 110, memory controller 25 selects a redundant storage configuration depending on the available memory space. In a calculating step 120, memory controller 25 calculates redundancy information using the selected redundant storage configuration. In a writing step 130, memory controller 25 writes the data and the redundancy information to the available memory space in the memory.

In one redundant storage configuration, the redundancy information can be calculated in step 120 by performing bit-wise logical XOR operation over multiple memory blocks of data, to produce a XOR parity block which is stored in memory in step 130. Using such RAID XOR techniques, a RAID stripe comprises N blocks: N−1 data blocks and a parity (redundancy) block that is computed by bit-wise XOR operation on the N−1 data blocks, where N is an integer. In the event of a single block failure in the stripe, the memory controller can reconstruct the data from the parity block and the remaining blocks.

For smaller N, more parity blocks for a given volume of data are computed, and the amount of memory space available in the SSD is reduced. Conversely, by increasing N, each parity block is created from a larger number of data blocks, thus increasing the available memory space.

In an embodiment, if the memory controller detects that the memory space available for new data in step 100 is below a predefined threshold, the controller may increase N in step 110 so as to create the redundancy data in step 120 by calculating the XOR over more data blocks. Increasing N reduces the number of parity blocks, or effectively the memory space occupied by all of the redundancy information. The remaining available memory space can be used, for example, for storing new data or for providing higher over-provisioning.

In an alternative redundant storage configuration, memory controller 25 may calculate the redundancy information using an error correcting code (ECC) scheme in step 120. In other words, the redundancy information in these embodiments comprises the redundancy bits of the ECC. Decoding the stored ECC encoded data can be used to retrieve lost data. One special class of codes that are commonly used in non-volatile memory systems is Low Density Parity Check (LDPC) codes. Other classes of codes such as Bose-Chaudhuri-Hocquenghem (BCH) codes may also be used. The redundancy bits used in the coding schemes can be stored in memory blocks either with the data blocks or separately from the data blocks.

For each of these classes of ECC codes, the ratio of the encoded data size to the original raw data size is referred to as a coding rate. Some ECC encoders and decoders can be configured to modify the code rate such that the memory controller can reduce the size of the encoded data in memory in step 110 if the evaluated available memory space in step 100 is below a predefined threshold. Alternatively, the memory controller can change the coding scheme in step 110 to make an effective change in the code rate in order to change the size of the redundancy information written to memory in step 130 in response to the available memory space in step 100.

In either of the redundant storage configurations based on the XOR or ECC schemes previously described, the memory controller can change the size of the redundancy information stored in the memory in response to an initial assessment of the currently available memory space in step 100 remaining in the memory to write new data. If the available memory is below a predefined threshold, the size of the redundancy information can be made smaller in step 120. The memory controller may even decide in step 110 not to create any redundancy information if little memory is left available for new data. The memory controller may decide to change the overall redundant storage configuration from ECC to XOR in step 110, for example, or to any suitable redundancy scheme.

The redundancy schemes of ECC and XOR previously described and the flow chart shown in FIG. 2 are by way of example and not by limitation of the embodiments of the present invention. Any suitable redundant storage configuration can be used, where the memory controller has the flexibility to effectively change the size of the redundancy information stored in memory in step 110 and step 120, in response to evaluating that the available memory space in step 100 has been reduced below a predefined threshold, in accordance with the embodiments of the present invention.

In some embodiments, the memory controller modifies the redundant storage configuration by reassigning a memory block that previously served as a parity block to serve as a data block. The reassignment may occur, for example, after the RAID stripe is successfully written. This sort of reassignment effectively changes the parity block into a data block. The proportion of memory space dedicated for redundancy is thus dynamically changed when the memory space for new data is below a predefined threshold.

In other embodiments, the memory controller stores the redundancy information in a dedicated redundancy stripe, e.g., a dedicated group of blocks. As the memory becomes full, the memory controller may reassign the redundancy stripe, or parts thereof, for storing new data.

Generally, the redundant storage configuration may comprise storing the redundancy information calculated in step 120 in a parity block or stripe, which is reused as the memory controller detects that the available space for new data evaluated in step 100 is too low (e.g., below a predefined threshold). The redundancy information can be stored in a reusable parity block or stripe in a first separate Flash memory device in step 130, and the data is written into the data blocks in one or more Flash memory devices different from the first Flash device for the redundancy information in order to increase the endurance of the blocks in which are reused for the redundancy information.

In yet other embodiments, memory controller 25 may apply full protection against block failure during programming, and later revert to protecting only against word-line failures during readout. In these embodiments, the memory controller initially stores the data using a redundant storage configuration that produces a redundancy block that protects against block failure. When recycling the redundancy block (e.g., as part of a compaction of "garbage collection" process), the memory controller may replace the full redundancy block with individual redundancy pages that protect against individual word line failures. The latter scheme incurs less overhead, for example, since it protects only valid pages instead of entire blocks.

Although the embodiments described herein mainly address redundancy configurations in solid state drives, the methods described herein can also be used in any other suitable data storage system.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
in a memory controller that controls a memory, evaluating an available memory space remaining in the memory to write data;
selecting in the memory controller a redundant storage configuration depending on the available memory space;
calculating redundancy information over the data using the selected redundant storage configuration; and
writing the data and the redundancy information to the available memory space in the memory;
wherein selecting the redundant storage configuration includes switching from a first storage configuration that protects against failure of one or more entire memory blocks to a second storage configuration that protects against failure of only portions of the memory blocks in response to determining a programming operation has completed; and
wherein switching from the first to the second storage configuration includes replacing a first redundancy block with a second redundancy block during a compaction operation, wherein the first redundancy block is generated using the first storage configuration and the second redundancy block is generated using the second storage configuration.

2. The method according to claim 1, wherein selecting the redundant storage configuration comprises choosing, based on the available memory space, a number of memory blocks over which the redundancy information is calculated.

3. The method according to claim 1, wherein selecting the redundant storage configuration comprises choosing an Error Correction Code (ECC) having a code rate that depends on the available memory space, and wherein calculating the redundancy information comprises computing the redundancy information using the chosen ECC.

4. The method according to claim 1, wherein selecting the redundant storage configuration comprises reassigning one or more memory blocks from storing a part of the redundancy information to storing a portion of the data.

5. The method according to claim 1, wherein selecting the redundant storage configuration comprises modifying the redundant storage configuration upon detecting that the available memory space is below a predefined threshold.

6. An apparatus, comprising:
a memory; and
a memory controller configured to:
evaluate an available memory space remaining in the memory to write data;
select a redundant storage configuration depending on the available memory space;
calculate redundancy information over the data using the selected redundant storage configuration; and
write the data and the redundancy information to the available memory space in the memory;
wherein to select the redundant storage configuration, the memory controller is further configured to switch from a first storage configuration that protects against failure of one or more entire memory blocks to a second storage configuration that protects against failure of only portions of the memory blocks in response to a determination that a programming operation has completed; and
wherein to switch from the first to the second storage configuration, the memory controller is further configured to replace a first redundancy block with a second redundancy block during a compaction operation, wherein the first redundancy block is generated using the first storage configuration and the second redundancy block is generated using the second storage configuration.

7. The apparatus according to claim 6, wherein the memory controller is configured to choose, based on the available memory space, a number of memory blocks over which the redundancy information is calculated.

8. The apparatus according to claim 6, wherein the memory controller is configured to choose an Error Correction Code (ECC) having a code rate that depends on the available memory space, and to calculate the redundancy information using the chosen ECC.

9. The apparatus according to claim 6, wherein the memory controller is configured to reassign one or more memory blocks from storing a part of the redundancy information to storing a portion of the data.

10. The apparatus according to claim 6, wherein the memory controller is configured to modify the redundant storage configuration upon detecting that the available memory space is below a predefined threshold.

11. A memory controller, comprising:
an interface for communicating with a memory; and
a processor configured to:
evaluate an available memory space remaining in the memory to write data;
select a redundant storage configuration depending on the available memory space;
calculate redundancy information over the data using the selected redundant storage configuration; and
write the data and the redundancy information to the available memory space in the memory;
wherein to select the redundant storage configuration, the processor is further configured to switch from a first storage configuration that protects against failure of one or more entire memory blocks to a second storage configuration that protects against failure of only portions of the memory blocks in response to a determination that a programming operation has completed; and
wherein to switch from the first to the second storage configuration, the processor is further configured to replace a first redundancy block with a second redundancy block during a compaction operation, wherein the first redundancy block is generated using the first storage configuration and the second redundancy block is generated using the second storage configuration.

12. The memory controller according to claim 11, wherein the processor is configured to choose, based on the available memory space, a number of memory blocks over which the redundancy information is calculated.

13. The memory controller according to claim 11, wherein the processor is configured to reassign one or more memory blocks from storing a part of the redundancy information to storing a portion of the data.

14. The memory controller according to claim 11, wherein the processor is configured to modify the redundant storage configuration upon detecting that the available memory space is below a predefined threshold.

* * * * *